United States Patent
Peterson et al.

(10) Patent No.: US 11,815,608 B2
(45) Date of Patent: Nov. 14, 2023

(54) VECTOR AIR DATA DYNAMIC CONSTRAINING AND SELF-CHECKING SYSTEMS AND METHODS

(71) Applicant: Honeywell International Inc., Morris Plains, NJ (US)

(72) Inventors: Timothy A. Peterson, Minneapolis, MN (US); Xiao Zhu Fan, Plymouth, MN (US); Matthew Wiebold, Mankato, MN (US)

(73) Assignee: Honeywell International Inc., Charlotte, NC (US)

( * ) Notice: Subject to any disclaimer, the term of this patent is extended or adjusted under 35 U.S.C. 154(b) by 417 days.

(21) Appl. No.: 16/941,277

(22) Filed: Jul. 28, 2020

(65) Prior Publication Data

US 2022/0036742 A1    Feb. 3, 2022

(51) Int. Cl.
*G01S 19/24* (2010.01)
*G01P 13/02* (2006.01)
*G01P 21/00* (2006.01)

(52) U.S. Cl.
CPC .......... *G01S 19/246* (2013.01); *G01P 13/025* (2013.01); *G01P 21/00* (2013.01)

(58) Field of Classification Search
CPC ........ G01S 19/246; G01S 17/95; G01S 7/497; G01S 17/933; G01S 17/58; G01P 13/025; G01P 21/00; G01P 5/26; Y02A 90/10
See application file for complete search history.

(56) References Cited

U.S. PATENT DOCUMENTS 4,312,262 A * 1/1982 Tye ............................ F41G 3/22
                                                 89/41.21
4,954,837 A * 9/1990 Baird ................... G01C 21/005
                                                 342/458

(Continued)

FOREIGN PATENT DOCUMENTS

EP    1293784 B1    11/2008
EP    2439541 B1    2/2014

OTHER PUBLICATIONS

Augere et al., "1.5um Lidar anemometer for True Air Speed, Angle of Sideslip and Angle of Attack measurements onboard Piaggio P180 aircraft", Office National d'Etudes et de Recherches Aerospatiales (ONERA), Departement d'Optique Theorique et Appliquees (DOTA), Feb. 2, 2015, pp. 1 through 15, HAL.

(Continued)

*Primary Examiner* — Behrang Badii
(74) *Attorney, Agent, or Firm* — Fogg & Powers LLC (57) ABSTRACT

In an embodiment, a method is provided. The method comprises selecting at least one set of line of sight (LOS) vectors oriented in one or more directions outward from a vehicle; determining at least one air data solution based on the at least one set of LOS vectors; adjusting at least one value of an air vector equation based on a predetermined quantity; upon adjusting the at least one value, then determining at least one modified air data solution, wherein the at least one modified air data solution is determined based on the at least one set of LOS vectors and the at least one value; and comparing a difference between the at least one air data solution and the at least one modified air data solution to a threshold value, wherein the threshold value is indicative of error with respect to the at least one set of LOS vectors.

20 Claims, 6 Drawing Sheets

(56) References Cited

U.S. PATENT DOCUMENTS

| | | | |
|---|---|---|---|
| 6,621,561 B2* | 9/2003 | Holton | G01P 3/44 356/26 |
| 7,257,470 B2 | 8/2007 | Hongerholt et al. | |
| 8,422,001 B2 | 4/2013 | Lacondemine et al. | |
| 8,946,606 B1* | 2/2015 | Dennison | F41G 7/2293 382/103 |
| 8,976,342 B2 | 3/2015 | Lacondemine et al. | |
| 10,147,244 B2 | 12/2018 | Atalla et al. | |
| 10,732,289 B1* | 8/2020 | Wang | G01S 19/15 |
| 2010/0241293 A1 | 9/2010 | Ganguli et al. | |
| 2011/0043786 A1* | 2/2011 | Lacondemine | G01P 5/26 356/28.5 |
| 2014/0327569 A1* | 11/2014 | Fun | G01S 13/93 342/26 D |
| 2017/0358152 A1 | 12/2017 | Atalla et al. | |
| 2018/0299558 A1* | 10/2018 | Sakamaki | G01S 17/95 |
| 2019/0187280 A1 | 6/2019 | Lodden et al. | |
| 2019/0302141 A1 | 10/2019 | Caldwell et al. | |

OTHER PUBLICATIONS

Balzano et al., "Air Data Sensor Fault Detection with an Augmented Floating Limiter", International Journal of Aerospace Engineering, Nov. 25, 2018, pp. 1-17, vol. 2018, Hindawi.

Wan et al., "Real-time fault-tolerant moving horizon air data estimation for the Reconfigure benchmark", IEEE Transactions on Control Systems Technology, 2018, pp. 1 through 16,IEEE.

European Patent Office, "Extended European Search Report from U.S. Appl. No. 16/941,277, filed Dec. 15, 2021", from Foreign Counterpart to U.S. Appl. No. 16/941,277, dated Dec. 15, 2021, pp. 1 through 12, Published: EP.

Johnston, Ian A. et al., Flush Air Data System Calibration Using Numerical Simulation, XP-000791564, Journal of Spacecraft and Rockets, vol. 35, No. 6, Nov.-Dec. 1998, pp. 812 through 820.

* cited by examiner

VECTOR AIR DATA DYNAMIC CONSTRAINING AND SELF-CHECKING SYSTEMS AND METHODS

BACKGROUND

Modern aircraft depend on a rapid and accurate assessment of the flight environment to facilitate effective air travel. Oftentimes this information is provided by air data systems onboard the vehicle, which measure various air data parameters such as angle-of-attack, angle-of-sideslip, and airspeed. Some air data systems, known as optical air data systems, determine these parameters by Laser Doppler Velocimetry, in which frequency shifts of backscattered laser light along several lines of sight are used to infer the relative surrounding airflow velocity vector (magnitude and direction) in the aircraft frame.

However, air data sensors may be prone to faults over consistent long-term use. Such faults may inhibit the accuracy and precision of the air data system in providing essential flight environment information to the pilot. Therefore, a need exists for an improved air data system that can accurately detect faults in air data sensors. A second need arises for an air data system that is more resistant to the impacts of sensor faults to the integrity of the air data system.

SUMMARY

In one embodiment, a method is provided. The method comprises selecting at least one set of line of sight (LOS) vectors of a plurality of LOS vectors, wherein the plurality of LOS vectors are oriented in one or more directions outward from a vehicle. The method further comprises determining at least one air data solution based on the at least one set of LOS vectors. The method further comprises adjusting at least one value of an air vector equation based on a predetermined quantity. Upon adjusting the at least one value, the method then comprises determining at least one modified air data solution, wherein the at least one modified air data solution is determined based on the at least one set of LOS vectors and the at least one value. The method then ends with comparing a difference between the at least one air data solution and the at least one modified air data solution to a threshold value, wherein the threshold value is indicative of error with respect to the at least one set of LOS vectors.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The following disclosure describes techniques for identifying and correcting biases in generating solutions for air data measurements. Initially, sensors onboard the vehicle measure the frequency shift (Doppler shift) of the backscattered light along a set of LOS vectors extending outward from a vehicle (e.g., aircraft). Using the Doppler shift and the known relative orientation of the LOS vectors in the aircraft frame, an air data solution is generated to determine the air velocity vector relative to the aircraft frame.

Since sensors are prone to faults, however, this solution may not be accurate. Therefore, the accuracy of the solution is evaluated using a priori variable constraints that are applied based on expected values on what the air data solution should have been. Specifically, a variable used to generate the air data solution is adjusted, for example, by a user defined input, using the same set of LOS vectors to generate a modified air data solution. The modified air data solution is compared with the unmodified air data solution to determine a difference between the two data solutions, which can be compared to a threshold to determine whether the unmodified air data solution is inconsistent; particularly, whether the set of LOS vectors used to generate the unmodified air data solution is inconsistent. In some embodiments where an excessive (overconstrained) amount of LOS vectors are available, multiple vector sets chosen from the LOS vectors are used to determine modified air data solutions based on the applied constraint, in which case the faulty LOS vectors can be identified and even excluded based on significant differences in comparison with the other air data solutions.

The techniques described herein enable a more robust and accurate air data system for detecting faults within an air data measurement system, which can lead to a variety of uses for an aircraft implementing such techniques. For example, the integrity of the air data system can be monitored by issuing an alert when the modified and unmodified air data solutions reach significantly different results; that is, when the difference between the two solutions exceeds the threshold value. Additionally, or alternatively, the user can define a particular constraint interval to achieve the desired air data solution, such as a constraint satisfying the bounds of less than +/−1.0 degrees of a previously determined air data parameter. Any of the embodiments described herein thus enables for an air data system that not only exhibits greater fault tolerance than existing systems, but can improve the functionality and robustness of the air data system.

Any term not expressly defined is intended to be given its ordinary meaning as understood by one having ordinary skill in the art. For instance, the term "vehicle" as used herein includes but is not limited to, aerial traversing vehicles (e.g., commercial, non-commercial, or recreational aircraft), unmanned or space traversing vehicles (e.g., satellites, urban air mobility vehicles), and ground traversing vehicles (e.g., automobiles, trucks, motorcycles). Reference is made to an aircraft for pedagogical reasons; however, the principles described herein also apply to systems imposed on other vehicles where applicable.

Figure 1:
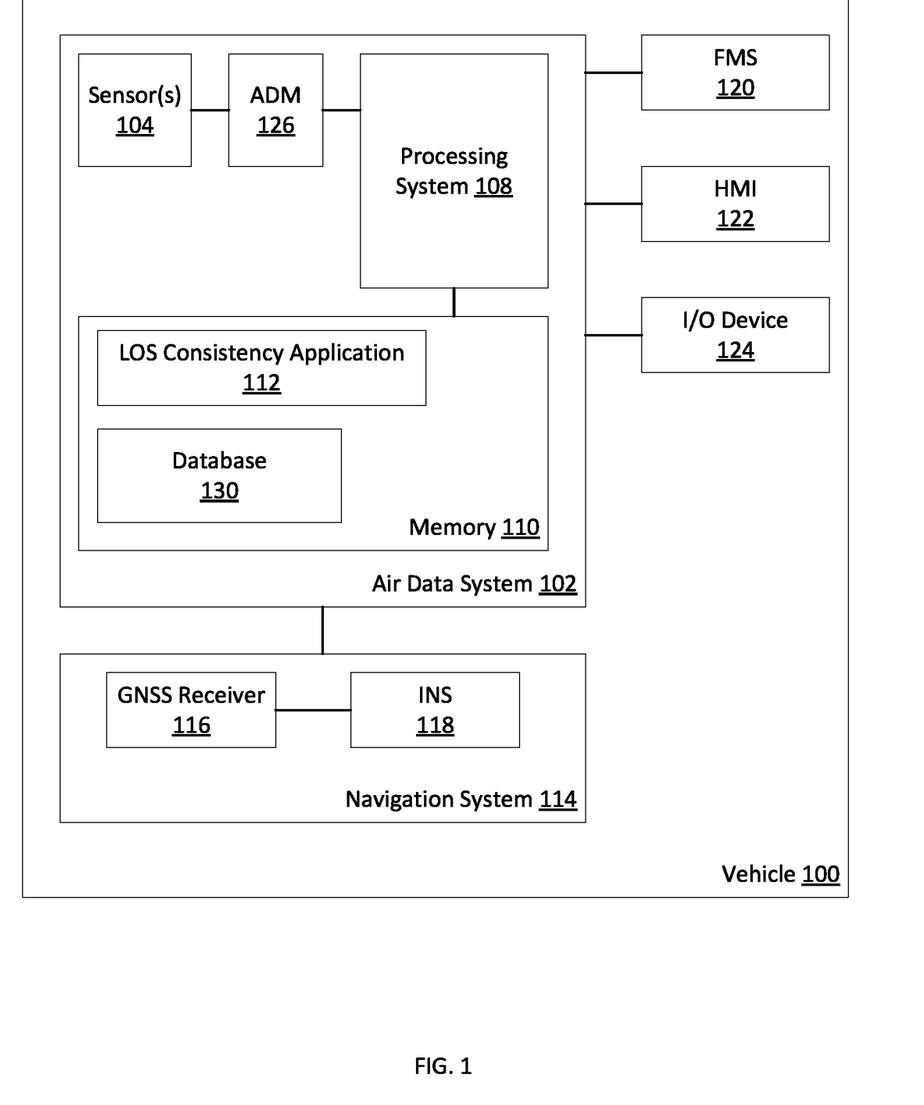
FIG. 1 depicts a system configured for identification and correction of air data solution parameters, as illustrated in one or more embodiments.

FIG. 1 illustrates a vehicle 100 that includes an air data system 102 configured to identify and correct inconsistent air data solution parameters. In addition to air data system 102, vehicle 100 may include navigation system 114, flight management system (FMS) 120, human-machine interface (HMI) 122, and one or more input/output (I/O) devices 124 that are coupled to air data system 102.

Air data system 102 includes one or more sensors 104, which can be mounted, oriented, or otherwise positioned along vehicle 100 in varying directions. Sensors 104 are configured to acquire measurements corresponding to the air speed of vehicle 100. In certain embodiments, sensors 104 may include a LiDAR (light detection and ranging) or RADAR (radio detection and ranging) alone or in combination with an air probe, pitot tube, or other type of sensor configured to measure airspeed. As described in further detail below, environmental measurements acquired by sensors 104 can be used for further processing to determine whether a faulty air data solution has been generated.

Sensors 104 may be coupled to optional air data module (ADM) 126. ADM 126 receives the airspeed measurements from one or more of the sensors 104 and determines an air data solution of vehicle 100 based on the received measurements. In some embodiments, each sensor is coupled to a corresponding ADM 126 that determines an air data solution based on the measurements of the respective sensor 104. However, a single ADM 126 may optionally receive measurements from different sensors and determine appropriate air data parameters that correspond to each of the measurements that are received. Since ADM 126 is optional, air data system 102 may not include ADM 126, in which case processing system 108 can determine air data solutions and/or parameters based on the measurements that are received by sensors 104.

The "air data solution" means a representation of an air velocity vector (that is, the speed and direction of the surrounding air relative to a vehicle) determined based on airspeed measurements. An air data solution can be acquired based on the airspeed measurements by techniques known in the art, such as via Laser Doppler Velocimetry (LDV) techniques. One example for generating an air data solution can be illustrated by the following equation:

$$\begin{bmatrix} \beta_1 \\ \beta_2 \\ \cdots \\ \beta_N \end{bmatrix} = \begin{bmatrix} r_x^1 & r_y^1 & r_z^1 \\ r_x^2 & r_y^2 & r_z^2 \\ \cdots & \cdots & \cdots \\ r_x^N & r_y^N & r_z^N \end{bmatrix} \begin{bmatrix} v_x \\ v_y \\ v_z \end{bmatrix} \qquad \text{Equation 1}$$

where $r^N$ corresponds to the Nth LOS vector of a set of N linearly independent LOS vectors, $\beta_N$ corresponds to the Doppler shift measurements along the Nth LOS vector, and v corresponds to the air velocity vector. As recognized by one skilled in the art, however, Equation 1 can be modified based on the number of LOS vectors that are used and the dimensions of each vector in a coordinate reference system. Equation 1 can be solved via various analytical techniques such as, but not limited to, a least-squares regression analysis.

The air data solution can then be used to determine an air data parameter. An "air data parameter" means a quantity relating to the movement of a vehicle derived from the air velocity vector, e.g., an air data solution. Air data parameters can include true airspeed, angle-of-attack, or angle-of-sideslip, or vector components thereof in a coordinate reference system (e.g., true airspeed in the y-direction of a Cartesian coordinate system).

Air data system 102 further includes processing system 108, which receives the air data solution(s) and/or optional airspeed measurements (if ADM 126 is not included) and analyzes the consistency of the generated air data solution. The processing system 108 may include any one or combination of processors, microprocessors, digital signal processors, application specific integrated circuits (ASICs), field programmable gate arrays (FPGAs), and/or other similar variants thereof. Processing system 108 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

As shown in FIG. 1, processing system 108 can be coupled to memory 110. Memory 122 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. In some embodiments, memory 110 may include LOS consistency application 112 and/or database 130. Processing system 108 can be configured to execute the instructions of LOS consistency application 112 to determine whether the air data solutions are consistent.

Figure 2:
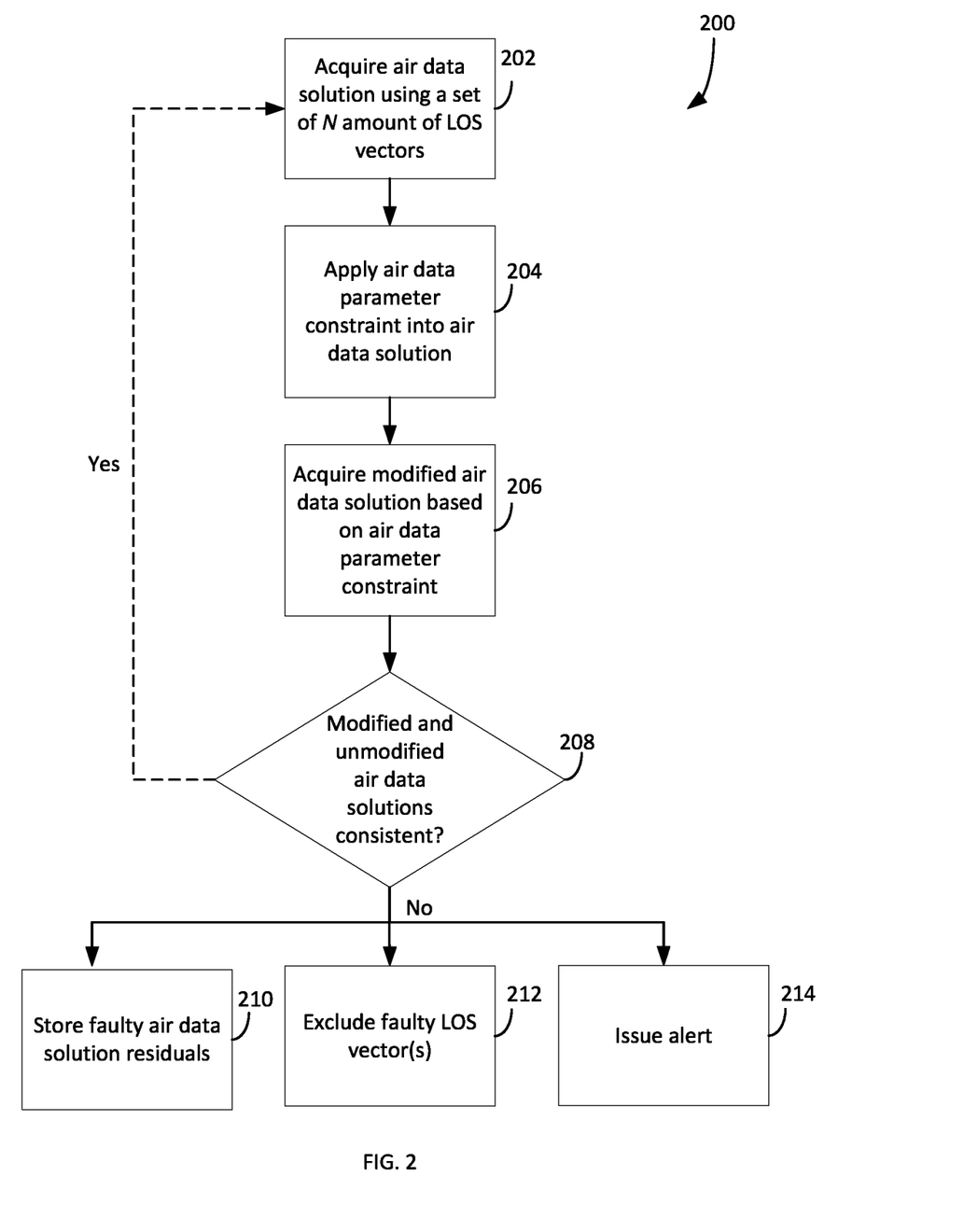
FIG. 2 depicts a flow diagram of a method for evaluating the consistency of an air data solution using an air data parameter constraint, as illustrated in one or more embodiments.

FIG. 2 illustrates a flow chart of a method 200 for detecting faults of LOS vectors used to generate air data solutions in an air data system. Method 200 may be implemented via the instructions of LOS consistency application 112 executed by processing system 108 as described in FIG. 1, but may be implemented via other techniques as well. The blocks of the flow diagram have been arranged in a generally sequential manner for ease of explanation; however, it is to be understood that this arrangement is merely exemplary, and it should be recognized that the processing associated with the system logic described herein (and the blocks shown in the Figures) may occur in a different order (for example, where at least some of the processing associated with the blocks is performed in parallel and/or in an event-driven manner).

Method 200 begins at block 202 by acquiring at least one air data solution using a set of N amount of LOS vectors. As understood by one skilled the art, the number of LOS vectors available should at least be equal to the dimensions of the vectors in a coordinate reference system. For example, if LOS vectors are generated in three-dimensional Cartesian space, a set of at least three LOS vectors should be selected to generate an air data solution, e.g., based on Equation 1. As described above, the LOS vectors should be oriented such that each LOS vector has a different direction in three-dimensional space (e.g., non-parallel).

Method 200 proceeds to block 204 by substituting an air data parameter constraint into the air data solution. For instance, the air data solution can be modified in Equation 1 by inputting a component of the air velocity vector, v. In a simplified example, the vehicle may be oriented such that the angle-of-sideslip is zero or approximately zero at a designated time period. In that case, the air data solution is modified by setting the $v_y$ component to zero. From there, a modified air data solution is generated based on the modified air velocity vector using the same set of LOS vectors used to generate the unmodified air data solution (as illustrated in block 206). While one component of the air velocity vector can be adjusted, constraints involving more than one component can be adjusted, as well as multiple constrains adjusting different vector components.

In some embodiments, the air data parameter constraint can be substituted based on a particular range of acceptable values, which may be set by the user (e.g., via user input) and/or dynamically via statistical techniques. For instance, a pilot may actively select an a priori constraint applied to the air data equation solution, such as by inputting an angle-of-sideslip constraint to be less than +/−1.0 degrees from e.g., a previously determined air data parameter (angle-of-sideslip) measurement. Alternatively, the interval can be represented as percentage value of a predefined value, such as an angle-of-attack constraint of 1% of a previously determined angle-of-attack measurement. As described in further detail below, the constraint range can be used to exclude LOS vectors that are used to generate air data solutions that fall outside of the predefined acceptable constraint values.

The air data constraints check LOS consistency based on a priori knowledge of expected system parameters. Such a priori knowledge can be acquired via a variety of techniques. In some embodiments, independent sensors onboard the vehicle can be configured to measure various air data parameters, such as angle-of-attack, angle-of-sideslip, and true airspeed. A priori knowledge may also be acquired based on user experience or by accessing a database that includes air data measurements, such as via database 130. Additionally, a priori knowledge can be extrapolated based on known statistical techniques and previously acquired data (e.g., minimum variance estimation (MVE) techniques) applied to the air data solution. By inputting such a constraint, the air data system can leverage the a priori constraint to discover a faulty LOS, which, when removed, will result in higher accuracy air data output.

Once a modified air data solution is generated based on the applied constraint, method 200 proceeds to block 208 by determining whether the modified and unmodified air data solutions are consistent. In one embodiment, consistency is determined by calculating the difference between the modified and unmodified air data solutions and then comparing the difference to a threshold value. If the difference does not exceed the threshold value, then the two solutions are consistent and no fault has occurred for the LOS vectors used to generate the unmodified and modified air data solutions. In that case, method 200 can optionally proceed back to block 202 to acquire an air data solution using a different set of LOS vectors and repeat the process.

Additionally, or alternatively, if a particular constraint range is chosen as the applied constraint, such as the case in which an air data parameter (e.g., angle-of-sideslip) value is within 1 degree or percentage, consistency can be determined by determining whether the modified air data solution falls within the predefined parameter constraint. For instance, if the applied air data parameter constraint is an angle-of-sideslip value within 1 degree of a previously determined value, the modified air data solution based on the constraint can be compared with the previous air data solution by determining the difference and comparing the difference to a threshold of 1 degree. Alternatively, if a percentage interval is used, the difference can be compared to a threshold value of the defined percentage of the acceptable constraint values.

If the difference between the unmodified and modified air data solutions exceeds a threshold value, method 200 can proceed in a variety of ways. First, as illustrated in block 214, method 200 may issue an alert to the user (e.g., to HMI 122) or to additional systems (e.g., FMS 120) that the consistency check has yielded an inconsistent result and therefore a fault has occurred with respect to at least one of the LOS vectors in the set. Second, method 200 may proceed to block 212 and exclude faulty LOS vectors used to generate the air data solution, as further described in FIGS. 4-5. Note that inconsistent LOS vectors can alternatively be de-weighted based on the level of inconsistency, instead of excluded or included in a binary fashion. Third, method 200 may proceed to block 210 and store faulty air data solution residuals in block 210, for example, in database 130, which can be used to modify the threshold level and improve the fault detection process. Although FIG. 2 illustrates blocks 210, 212, and 214 as discrete outputs, the LOS fault detection method can be modified so that these outputs are combined and integrated.

Figure 3:
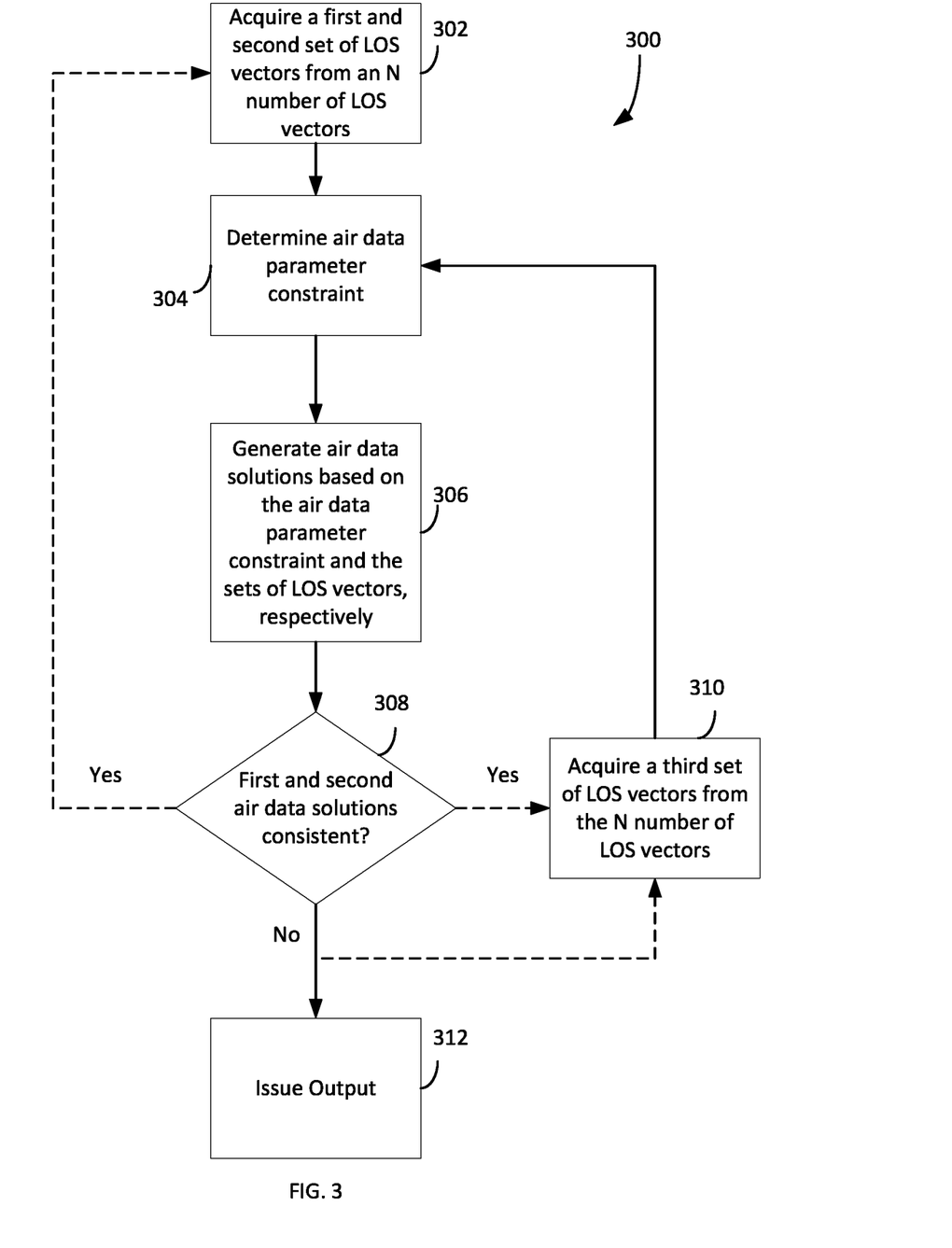
FIG. 3 depicts a flow diagram of a method for evaluating the consistency of air data solutions generated using over-constrained sets of LOS vectors and an air data parameter constraint, as illustrated in one or more embodiments.

Referring to FIG. 3, in some circumstances it may be desirable to generate air data solutions using an excess amount of LOS vectors. Using Equation 1 as an example, greater fault detection can be achieved when the number N of LOS vectors exceeds the dimensions of the air data solution. In this case, a plurality of sets can be used to detect faults within the LOS vectors, in which each set is composed of a different configuration of LOS vectors. To illustrate an example, an air data system can generate nine unique LOS vectors for a three-dimensional air data solution. A first set of three LOS vectors can be selected from the nine possibilities, while a second set can be selected composed of at least one LOS vector that is different from the first set.

FIG. 3 thus illustrates an example method 300 of evaluating LOS consistency and fault detection when the amount of LOS vectors is overconstrained, that is, when the number of available LOS vectors exceeds the amount needed to acquire an air data solution. Beginning at block 302, method 300 acquires a first and second set of LOS vectors from an N number of LOS vectors, wherein N is an overconstrained number relative to the necessary amount needed to generate an air data solution.

Method 300 then proceeds to block 304 by determining an air data parameter constraint, as described above with respect to FIG. 2. The air data parameter constraint is then applied with the first and second sets of LOS vectors to generate a first and second air data solution based on the air data parameter constraint and the first and second sets of LOS vectors, as illustrated in block 306. The first air data solution is determined from the first set of LOS vectors and the air data parameter constraint, while the second air data solution is determined from the second set of LOS vectors and the air data parameter constraint.

At block 308, method 300 determines whether the first and second air data solutions are consistent. As described with respect to FIG. 2, method 300 can determine the difference between the first and second air data solutions and compare the difference to a threshold value indicative of significant error between the two solutions. If the difference exceeds the threshold value (indicating the first and second air data solutions are inconsistent), then method 300 proceeds to block 312 and issue an appropriate output such as those described with respect to FIG. 2. For example, method 300 can exclude LOS vectors that are attributable to the significant disparity between the first and second air data solutions. In additional or alternative embodiments, the first and second air data solution residuals can be stored and accessed for later use. Optionally, method 300 can proceed to block 310 in acquiring a third set of LOS vectors from the N number of LOS vectors (if available), wherein the third set is distinct from the first set and the second set by at least one LOS vector.

If the first and second air data solutions are consistent (the difference is less than the threshold), method 300 can optionally proceed in one of two ways. First, method 300 can revert back to 302 and acquire a new set of LOS vectors that correspond to a new population of NLOS vectors. Method 300 can then repeat the process to determine whether the new sets of LOS vectors are consistent. Second, method 300 can optionally proceed to block 310 by acquiring a third set of LOS vectors from the existing N number of LOS vectors, if a third set is available.

From there, method 300 can revert to block 304 by applying the same air data parameter constraint used to generate the first and second air data solutions. Method 300 can then determine whether the third (and potentially more) air data solutions are consistent with the first and second air data solutions. As an example, method 300 can calculate a plurality of differences (for example, by calculating the difference between the first and the third air data solutions and the difference between the second and third air data solutions), and compare each difference to a threshold value. This exemplary technique enables LOS fault detection by isolating common LOS vectors whose generated air data solutions correspond to significant differences exceeding the threshold value. Ultimately, method 300 can generate modified air data solutions until the combination of LOS vector sets in the N population pool have been exhausted (that is, each combination of sets has been analyzed), which can provide a more reliable fault detection process. One skilled in the art will recognize that the quality of the fault detection process will increase as the number of N LOS vectors increases.

Figure 4:
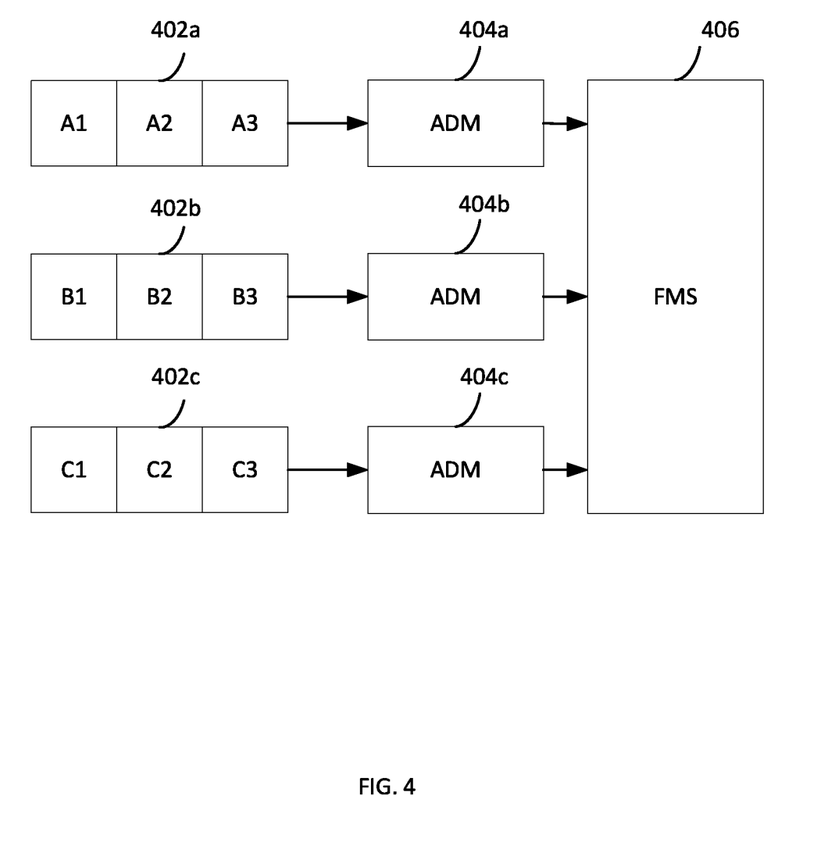
FIG. 4 depicts a diagram of a traditional process for determining consistency among sets of LOS vectors, as illustrated in one or more embodiments.
Figure 5:
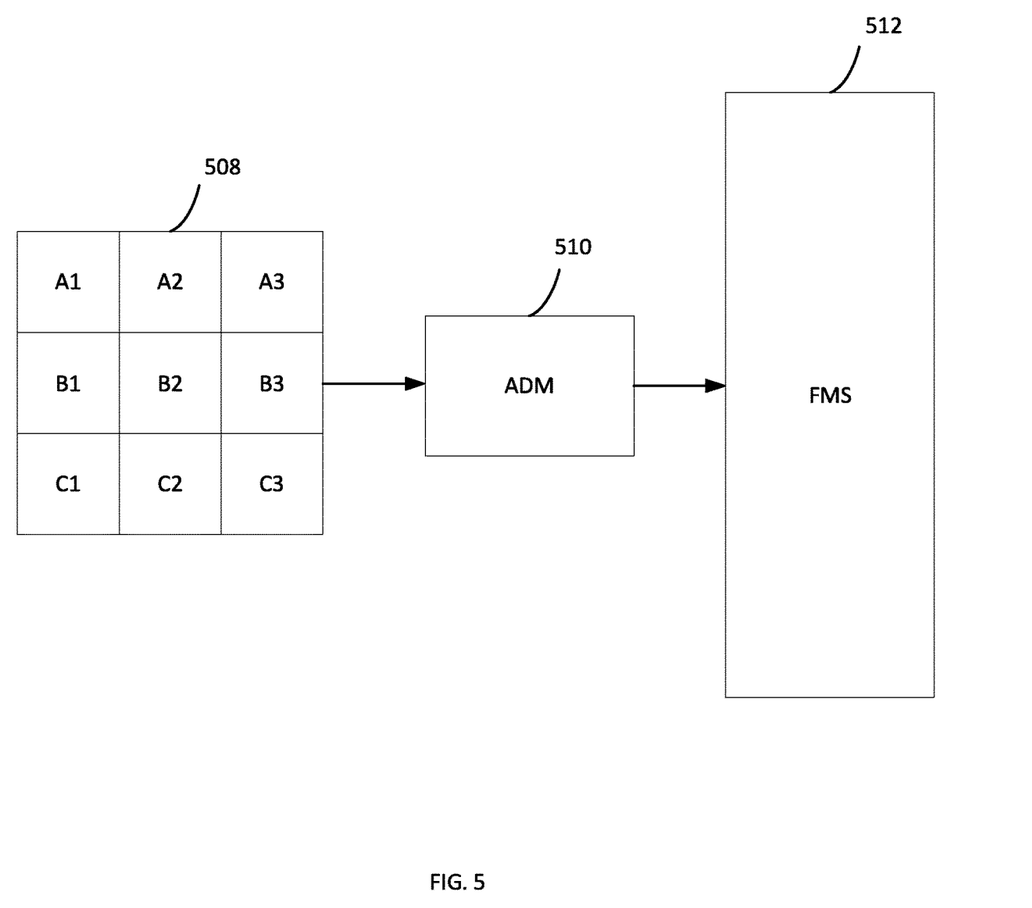
FIG. 5 depicts a diagram of an alternative process for determining consistency among sets of LOS vectors, as illustrated in one or more embodiments.

FIGS. 4-5 illustrate flow diagrams of distinct system architectures configured for determining the consistency of LOS vectors in an air data solution using the principles described above. For purposes of illustration, FIGS. 4-5 depict an overconstrained amount of N LOS vectors in which the fault detection processes of FIGS. 2-3 may apply.

FIG. 4 depicts the architecture of a traditional air data system configured to determine the consistency of LOS vectors in an air data solution. FIG. 4 includes three separate and independent air data systems represented as ADM 404*a-c*, respectively. In FIG. 4, each set of LOS vectors (represented as 402*a-c*) are sent to a respective ADM 404*a-c*, which then generates an air data solution based on the received LOS vector set. As illustrated in FIG. 4, for example, ADM 404*a* receives LOS vector set 402*a* and generates a first air data solution, while ADM 404*b* receives LOS vector set 402*b* and generates a corresponding second air data solution. Each ADM 404*a-c* can then determine the consistency of their respective air data solutions by adjusting an air data parameter and generating a modified air data solution as described above.

If one LOS vector in the LOS vector set 402*a* is faulty, for example LOS vector A1, then ADM 404*a* reports a fault to a FMS 406. Similarly, if LOS vector B2 and C3 of LOS vector sets 402*b* and 402*c*, respectively, experience a fault, ADMs 404*b* and 404*c* then also report a fault to FMS 406. Such system architecture can be problematic for aircraft that require greater fault tolerance in air data navigation.

In contrast, FIG. 5 illustrates the architecture of an air data system that can provide greater fault tolerance than the system described with respect to FIG. 4. FIG. 5 includes a centralized ADM 510 that receives each set of LOS vectors and determines the consistency between the LOS vector sets using the techniques described in FIGS. 3 and/or 4 above. For example, ADM 510 can generate an air data solution based on each LOS vector set (e.g. A1-A3, B1-B3, and C1-C3) and compare the air data solution with a modified air data solution by inputting an air data parameter constraint as illustrated in method 300. However, where the number of LOS vectors is overconstrained with respect to Equation 1 (as shown in vector set matrix 508), ADM 510 can choose any three LOS vectors and generate an air data solution based on the chosen vector set. For example, ADM 510 can select vectors A2, A3, and B3 to generate a first air data solution. ADM 510 can then generate a modified air data solution using constrained air data parameters, and repeat the process using another set of LOS vectors (e.g., vectors B3, C1, and A2) until it has exhausted all possible permutations of LOS vectors.

In some situations, one or more of the LOS vectors in vector set matrix 508 will be faulty. ADM 510 can detect such faults and report them to FMS 512. However, ADM 510 may alternatively exclude or de-weight the faulty LOS vectors from consideration of the air data solution and instead generate a final air data solution based on the remaining consistent LOS vectors, if sufficient LOS vectors are available. If LOS vectors A2, A3, and B2 experience faults, ADM 510 can exclude A2, A3, and B2 from the final air data solution provided to FMS 512 and instead use the remaining LOS vectors in vector set matrix 508. Therefore, ADM 510 can operate with greater fault tolerance than any of ADMs 404a-404c, thereby enabling for a more reliable and adaptable air data system.

Referring back to FIG. 1, air data system 102 can provide a final air data solution output to various systems and interfaces onboard vehicle 100, such as to FMS 120. In some embodiments, the output may further include an alert indicating that air data system 102 has experienced a fault with respect to at least one LOS vector, or may provide a report that no final air data solution could be generated due to inconsistent LOS vectors. For example, air data system 102 can send an output/alert to navigation system 114, which may include one or more Global Navigation Satellite System (GNSS) receivers 116 and inertial reference systems (INS) 118, which may adjust navigation parameters accordingly based on the air data output received from air data system 102. Additionally, vehicle 100 may be coupled to I/O device 124.

Vehicle 100 may further include HMI 122 configured to input air data parameter constraints by an operating user (e.g., pilot). HMI 122 may include a graphical display or screen. A user may interact with HMI 122 via knobs, buttons, selection devices (e.g., computer mouse), keys, and/or touch screen functionality. When a user wants to input an air data parameter, the user can input a desired parameter to substitute into the air data solution equation (e.g., Equation 1). For example, the user can input the constraint $v_y=0$, in which HMI 122 sends the constraint to air data system 102 to generate air data solutions using the constraint. Likewise, air data system 102 can send an output to the user via HMI 122 indicating the consistency of the constraint based on the LOS vectors used to generate the air data solution. A user can also use HMI 122 to generate an appropriate air data parameter constraint based on statistical techniques such as MVE.

Figure 6:
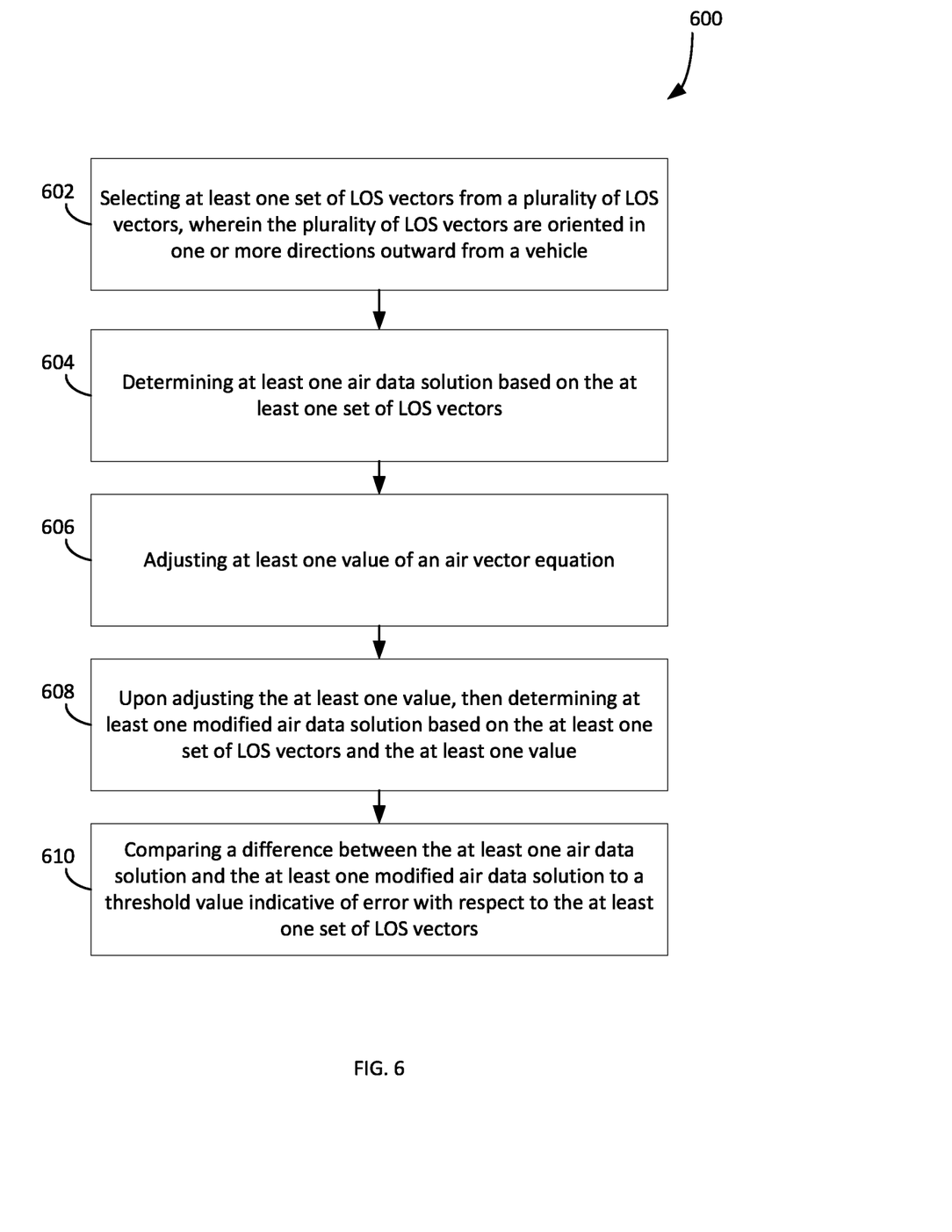
FIG. 6 depicts a method for identifying and correcting air data solution parameters generated by one or more sets of LOS vectors, as illustrated in one or more embodiments.

FIG. 6 illustrates a method for identifying and correcting air data solution parameters. Method 600 may be implemented using any of the techniques described with respect to FIGS. 1-5 but can be implemented via other techniques as well.

Method 600 begins at block 602 by selecting at least one set of LOS vectors from a plurality of LOS vectors, wherein the plurality of LOS vectors are oriented in one or more directions outward from a vehicle.

Method 600 proceeds to block 604 by determining at least one air data solution based on the at least one set of LOS vectors. When the number of LOS vectors in the LOS vector set is sufficient to generate an air data solution, then only one air data solution can be generated. However, if more than one sets of LOS vectors are generated, then multiple air data solutions can be generated based on each LOS vector set.

In block 606, method 600 adjusts at least one value of an air vector equation. As illustrated above, the at least one value can be a numerical constraint applied to the air vector equation based on a priori knowledge or approximation of what the expected quantity of the at least one value should be. In some embodiments, the value can be adjusted by inputting an air data parameter constraint, for example true airspeed, angle-of-attack, or angle-of-sideslip measurement, and convert the air data parameter value into a corresponding value of the air vector equation (e.g., $v_y=0$). In some embodiments, the at least one value can be adjusted based on statistical techniques such as MVE.

Upon adjusting the at least one value, method 600 then determines at least one modified air data solution based on the at least one set of LOS vectors and the at least one value in block 608. In embodiments where multiple sets of LOS vectors are generated, a modified air data solution can be generated based on each LOS vector with the at least one value.

Method 600 ends at block 610 by comparing a difference between the at least one air data solution and the at least one modified air data solution to a threshold value indicative of error with respect to the at least one set of LOS vectors. In embodiments where multiple sets of LOS vectors are generated, each modified air data solution can be compared and a corresponding difference between each comparison can be compared against the threshold value. When a difference exceeds the threshold value or is otherwise determined to be inconsistent with the at least one air data solution, an alert can be generated.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

Example Embodiments

Example 1 includes a method, comprising: selecting at least one set of line of sight (LOS) vectors of a plurality of LOS vectors, wherein the plurality of LOS vectors are oriented in one or more directions outward from a vehicle; determining at least one air data solution based on the at least one set of LOS vectors; adjusting at least one value of an air vector equation based on a predetermined quantity; upon adjusting the at least one value, then determining at least one modified air data solution, wherein the at least one modified air data solution is determined based on the at least one set of LOS vectors and the at least one value; and comparing a difference between the at least one air data solution and the at least one modified air data solution to a threshold value, wherein the threshold value is indicative of error with respect to the at least one set of LOS vectors.

Example 2 includes the method of Example 1, wherein: selecting at least one set of LOS vectors further comprises selecting a first set and a second set of LOS vectors, the at least one modified air data solution further comprises a first modified air data solution and a second modified air data solution, the first modified air data solution and the second modified air data solution based on (1) the first set and the second set of LOS vectors, respectively, and (2) the at least one value, and comparing a difference further comprises comparing the first modified air data solution and the second modified air data solution.

Example 3 includes the method of Example 2, further comprising: excluding one or more LOS vectors in the first modified air data solution or second modified air data solution when the difference exceeds the threshold value; and determining a final air data solution based on the remaining LOS vectors used to generate the at least one modified air data solution.

Example 4 includes the method of any of Examples 2-3, further comprising storing residuals of the first and second modified air data solutions when the difference exceeds the threshold value, wherein the threshold value is adjusted based on the residuals.

Example 5 includes the method of any of Examples 1-4, wherein comparing a difference between the at least one air data solution and the modified air data solution further comprises issuing an alert when the difference is greater than the threshold value.

Example 6 includes the method of any of Examples 1-5, wherein adjusting at least one value of an air vector equation further comprises adjusting the at least one value by user input based on an air data parameter, and further comprising excluding one or more LOS vectors used to generate the at least one modified air data solution when the difference exceeds the threshold value.

Example 7 includes the method of any of Examples 1-6, wherein adjusting at least one value of an air vector equation further comprises adjusting at least one vector component of an air velocity vector, wherein the at least one vector component is adjusted based on minimum variance estimation (MVE).

Example 8 includes a system, comprising, one or more sensors mounted on a vehicle, wherein the one or more sensors are configured to determine Doppler shifted frequency measurements based on a plurality of line of sight (LOS) vectors oriented in one or more directions outward from the vehicle; and a processing system coupled to the one or more sensors, wherein the processing system comprises one or more processors configured to: select at least one set of LOS vectors of the plurality of LOS vectors; determine at least one air data solution based on the at least one set of LOS vectors; adjust at least one value of an air vector equation based on a predetermined quantity; upon adjusting the at least one value, then determine at least one modified air data solution, wherein the at least one modified air data solution is determined based on the at least one set of LOS vectors and the at least one value; and compare a difference between the at least one air data solution and the at least one modified air data solution to a threshold value, wherein the threshold value is indicative of error with respect to the at least one set of LOS vectors.

Example 9 includes the system of Example 8, wherein the processing system is further configured to: select a first set and a second set of LOS vectors, determine a first modified air data solution and a second modified air data solution, the first modified air data solution and the second modified air data solution based on (1) the first set and the second set of LOS vectors, respectively, and (2) the at least one value, and compare a difference between the first modified air data solution and the second modified air data solution.

Example 10 includes the system of Example 9, wherein the processing system is further configured to: exclude one or more LOS vectors in the first modified air data solution or second modified air data solution when the difference exceeds the threshold value; and determine a final air data solution based on the remaining LOS vectors used to generate the at least one modified air data solution.

Example 11 includes the system of any of Examples 9-10, further comprising a database, wherein the processing system is configured to store residuals of the first and second modified air data solutions in the database when the difference exceeds the threshold value, wherein the threshold value is adjusted based on the residuals.

Example 12 includes the system of any of Examples 8-11, wherein the processing system is further configured to issue an alert to at least one of a navigation system, a flight management system, and a human machine interface when the difference is greater than the threshold value.

Example 13 includes the system of any of Examples 8-12, wherein the processing system is coupled to a human machine interface, wherein the human machine interface is operative to configure the processing system to adjust the at least one value via user input based on an air data parameter, and wherein the processing system is configured to exclude one or more LOS vectors used to generate the at least one modified air data solution when the difference exceeds the threshold value.

Example 14 includes the system of any of Examples 8-13, wherein the at least one value comprises at least one vector component of an air velocity vector, wherein the processing system is configured to adjust the at least one vector component based on minimum variance estimation (MVE).

Example 15 includes a non-transitory computer readable medium including instructions which, when executed by one or more processing devices, cause the one or more processing devices to: select at least one set of line of sight (LOS) vectors of a plurality of LOS vectors, wherein the plurality of LOS vectors are oriented in one or more directions outward from a vehicle; determine at least one air data solution based on the at least one set of LOS vectors; adjust at least one value of an air vector equation based on a predetermined quantity; upon adjusting the at least one value, then determine at least one modified air data solution, wherein the at least one modified air data solution is determined based on the at least one set of LOS vectors and the at least one value; and compare a difference between the at least one air data solution and the at least one modified air data solution to a threshold value, wherein the threshold value is indicative of error with respect to the at least one set of LOS vectors.

Example 16 includes the non-transitory computer readable medium of Example 15, wherein: selecting at least one set of LOS vectors further comprises selecting a first set and a second set of LOS vectors, the at least one modified air data solution further comprises a first modified air data solution and a second modified air data solution, the first modified air data solution and the second modified air data solution based on (1) the first set and the second set of LOS vectors, respectively, and (2) the at least one value, and comparing a difference further comprises comparing the first modified air data solution and the second modified air data solution.

Example 17 includes the non-transitory computer readable medium of Example 16, wherein the instructions cause the one or more processing devices to: exclude one or more LOS vectors in the first modified air data solution or second modified air data solution when the difference exceeds the threshold value; and determine a final air data solution based on the remaining LOS vectors used to generate the at least one modified air data solution.

Example 18 includes the non-transitory computer readable medium of any of Examples 16-17, wherein the instructions cause the one or more processing devices to store residuals of the first and second modified air data solutions when the difference exceeds the threshold value, wherein the threshold value is adjusted based on the residuals.

Example 19 includes the non-transitory computer readable medium of any of Examples 15-18, wherein the instructions cause the one or more processing devices to issue an alert when the difference is greater than the threshold value.

Example 20 includes the non-transitory computer readable medium of any of Examples 15-19, wherein adjusting at least one value of an air vector equation further comprises adjusting the at least one value by user input based on an air data parameter, and wherein the instructions cause the one or more processing devices to exclude one or more LOS vectors used to generate the at least one modified air data solution when the difference exceeds the threshold value.

From the foregoing, it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the circuit components described above may be disposed on a single or multiple integrated circuit (IC), one or more microprocessors, or one or more microcontrollers. In addition, one or more components of a described apparatus or system may have been omitted from the description for clarity or another reason. Furthermore, one or more components of a described apparatus or system that have been included in the description may be omitted from the apparatus or system.

What is claimed is:

1. A method, comprising:
   determining, from one or more sensors mounted on a vehicle, Doppler shifted frequency measurements corresponding to a plurality of line of sight (LOS) vectors, wherein the Doppler shifted frequency measurements are determined from a detected backscattered portion of light along the plurality of LOS vectors;
   selecting, by at least one processor coupled to the one or more sensors, at least one set of LOS vectors of the plurality of LOS vectors, wherein the plurality of LOS vectors are oriented in one or more directions outward from the vehicle;
   determining, by the at least one processor, at least one air data solution based on the at least one set of LOS vectors and the Doppler shifted frequency measurements corresponding to the at least one set of LOS vectors;
   adjusting, by the at least one processor, at least one value of an air vector equation based on a predetermined quantity;
   upon adjusting the at least one value, then determining, by the at least one processor, at least one modified air data solution, wherein the at least one modified air data solution is determined based on the at least one set of LOS vectors and the at least one value;
   comparing, by the at least one processor, a difference between the at least one air data solution and the at least one modified air data solution to a threshold value, wherein the threshold value is indicative of error with respect to the at least one set of LOS vectors; and
   determining, by the at least one processor, whether a fault has occurred in at least one of the one or more sensors based on the difference.

2. The method of claim 1, wherein:
   selecting at least one set of LOS vectors further comprises selecting a first set and a second set of LOS vectors,
   the at least one modified air data solution further comprises a first modified air data solution and a second modified air data solution, the first modified air data solution and the second modified air data solution based on (1) the first set and the second set of LOS vectors, respectively, and (2) the at least one value, and
   comparing a difference further comprises comparing the first modified air data solution and the second modified air data solution.

3. The method of claim 2, further comprising:
   excluding one or more LOS vectors in the first modified air data solution or second modified air data solution when the difference exceeds the threshold value; and
   determining a final air data solution based on the remaining LOS vectors used to generate the at least one modified air data solution.

4. The method of claim 2, further comprising storing residuals of the first and second modified air data solutions when the difference exceeds the threshold value, wherein the threshold value is adjusted based on the residuals.

5. The method of claim 1, wherein comparing a difference between the at least one air data solution and the modified air data solution further comprises issuing an alert when the difference is greater than the threshold value.

6. The method of claim 1, wherein adjusting at least one value of an air vector equation further comprises adjusting the at least one value by user input based on an air data parameter, and further comprising excluding one or more LOS vectors used to generate the at least one modified air data solution when the difference exceeds the threshold value.

7. The method of claim 1, wherein adjusting at least one value of an air vector equation further comprises adjusting at least one vector component of an air velocity vector, wherein the at least one vector component is adjusted based on minimum variance estimation (MVE).

8. A system, comprising:
   one or more sensors mounted on a vehicle, wherein the one or more sensors are configured to determine Doppler shifted frequency measurements corresponding to a plurality of line of sight (LOS) vectors oriented in one or more directions outward from the vehicle, wherein the Doppler shifted frequency measurements are determined from a detected backscattered portion of light along the plurality of LOS vectors; and
   a processing system coupled to the one or more sensors, wherein the processing system comprises one or more processors configured to:
   select at least one set of LOS vectors of the plurality of LOS vectors;
   determine at least one air data solution based on the at least one set of LOS vectors and the Doppler shifted frequency measurements corresponding to the at least one set of LOS vectors;
   adjust at least one value of an air vector equation based on a predetermined quantity;
   upon adjusting the at least one value, then determine at least one modified air data solution, wherein the at least one modified air data solution is determined based on the at least one set of LOS vectors and the at least one value;

compare a difference between the at least one air data solution and the at least one modified air data solution to a threshold value, wherein the threshold value is indicative of error with respect to the at least one set of LOS vectors; and determine whether a fault has occurred in at least one of the one or more sensors based on the difference.

9. The system of claim 8, wherein the processing system is further configured to:

select a first set and a second set of LOS vectors, determine a first modified air data solution and a second modified air data solution, the first modified air data solution and the second modified air data solution based on (1) the first set and the second set of LOS vectors, respectively, and (2) the at least one value, and compare a difference between the first modified air data solution and the second modified air data solution.

10. The system of claim 9, wherein the processing system is further configured to:

exclude one or more LOS vectors in the first modified air data solution or second modified air data solution when the difference exceeds the threshold value; and determine a final air data solution based on the remaining LOS vectors used to generate the at least one modified air data solution.

11. The system of claim 9, further comprising a database, wherein the processing system is configured to store residuals of the first and second modified air data solutions in the database when the difference exceeds the threshold value, wherein the threshold value is adjusted based on the residuals.

12. The system of claim 8, wherein the processing system is further configured to issue an alert to at least one of a navigation system, a flight management system, and a human machine interface when the difference is greater than the threshold value.

13. The system of claim 8, wherein the processing system is coupled to a human machine interface, wherein the human machine interface is operative to configure the processing system to adjust the at least one value via user input based on an air data parameter, and wherein the processing system is configured to exclude one or more LOS vectors used to generate the at least one modified air data solution when the difference exceeds the threshold value.

14. The system of claim 8, wherein the at least one value comprises at least one vector component of an air velocity vector, wherein the processing system is configured to adjust the at least one vector component based on minimum variance estimation (MVE).

15. A non-transitory computer readable medium including instructions which, when executed by one or more processing devices, cause the one or more processing devices to:

receive, from one or more sensors, Doppler shifted frequency measurements corresponding to a plurality of line of sight (LOS) vectors, wherein the Doppler shifted frequency measurements are determined from a detected backscattered portion of light along the plurality of LOS vectors;

select at least one set of line of sight (LOS) vectors of a plurality of LOS vectors, wherein the plurality of LOS vectors are oriented in one or more directions outward from a vehicle;

determine at least one air data solution based on the at least one set of LOS vectors and the Doppler shifted frequency measurements corresponding to the at least set of LOS vectors;

adjust at least one value of an air vector equation based on a predetermined quantity;

upon adjusting the at least one value, then determine at least one modified air data solution, wherein the at least one modified air data solution is determined based on the at least one set of LOS vectors and the at least one value;

compare a difference between the at least one air data solution and the at least one modified air data solution to a threshold value, wherein the threshold value is indicative of error with respect to the at least one set of LOS vectors; and determine whether a fault has occurred in at least one of the one or more sensors based on the difference.

16. The non-transitory computer readable medium of claim 15, wherein:

selecting at least one set of LOS vectors further comprises selecting a first set and a second set of LOS vectors, the at least one modified air data solution further comprises a first modified air data solution and a second modified air data solution, the first modified air data solution and the second modified air data solution based on (1) the first set and the second set of LOS vectors, respectively, and (2) the at least one value, and comparing a difference further comprises comparing the first modified air data solution and the second modified air data solution.

17. The non-transitory computer readable medium of claim 16, wherein the instructions cause the one or more processing devices to:

exclude one or more LOS vectors in the first modified air data solution or second modified air data solution when the difference exceeds the threshold value; and determine a final air data solution based on the remaining LOS vectors used to generate the at least one modified air data solution.

18. The non-transitory computer readable medium of claim 16, wherein the instructions cause the one or more processing devices to store residuals of the first and second modified air data solutions when the difference exceeds the threshold value, wherein the threshold value is adjusted based on the residuals.

19. The non-transitory computer readable medium of claim 15, wherein the instructions cause the one or more processing devices to issue an alert when the difference is greater than the threshold value.

20. The non-transitory computer readable medium of claim 15, wherein adjusting at least one value of an air vector equation further comprises adjusting the at least one value by user input based on an air data parameter, and wherein the instructions cause the one or more processing devices to exclude one or more LOS vectors used to generate the at least one modified air data solution when the difference exceeds the threshold value.

\* \* \* \* \*